Jan. 15, 1963
N. R. HAGLER
3,073,345
SOLENOID OPERATED VACUUM REGULATOR
Filed May 1, 1961
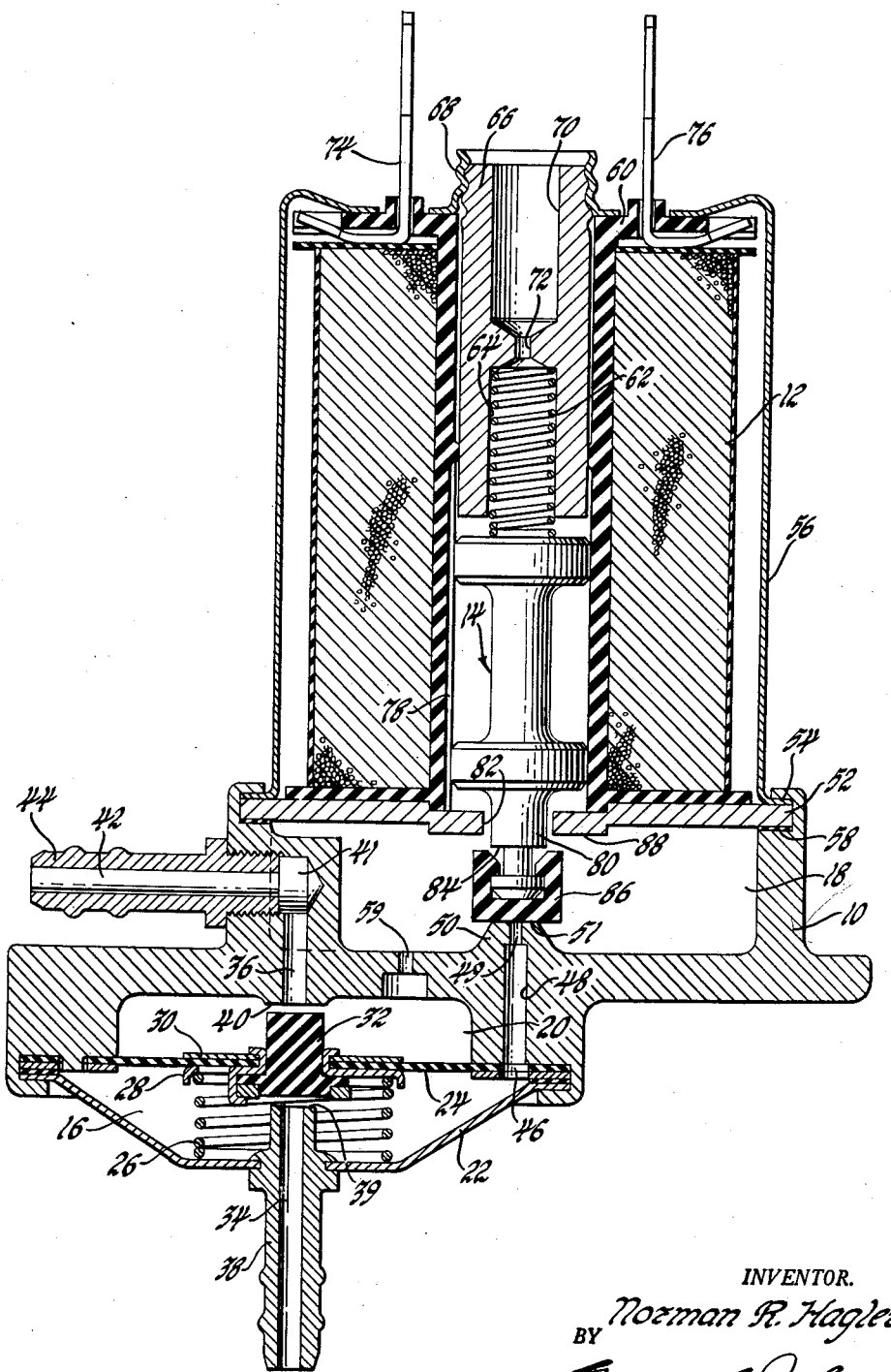
INVENTOR.
BY *Norman R. Hagler*
*George C. Johnson*
ATTORNEY

United States Patent Office 3,073,345
Patented Jan. 15, 1963

3,073,345
SOLENOID OPERATED VACUUM REGULATOR
Norman R. Hagler, New Berlin, Wis., assignor to General Motors Corporation, Detroit, Mich., a corporation of Delaware
Filed May 1, 1961, Ser. No. 106,952
5 Claims. (Cl. 137—623)

This invention relates to a valve mechanism and more particularly to a regulator for controlling an extent of vacuum dependent upon an electric current supply.

A variable vacuum supply source is readily available in the form of the intake manifold of the conventional automobile motor for the purpose of operating accessories. It is desirable, however, to control the level or extent of vacuum as applied to a power unit such as a vacuum motor not merely to turn the motor "on" or "off" but also to effect an intermediate position of the motor when the latter result is needed. The motor may be of a diaphragm or piston type and may be used to control a valve determining the amount of engine coolant flowing through a heater core or to control a damper position whereby the percentage of air directed through the heater core or a heater core by-pass or both is determined. Modulated control of such a valve or damper placed in one locality and in accordance with a condition such as temperature existent in another locality is highly desirable.

In the instant case, a thermistor or variable resistance valve may be used to detect temperature changes and for imparting a signal to a variable pulsating amplifier to complete a servo system which is the source of a variable current to operate a vacuum regulator, thereby resulting in the desired vacuum supplied to a vacuum operated motor. The servo system is not described herein as it forms no part of the present invention. One of a number of circuits which could be used and which illustrates that the present invention may be employed in arrangements other than heater valve control is the United States Patent No. 2,788,449, granted April 9, 1957, in the name of R. L. Bright. In that patent, the ratio of positive to negative current periods is controlled by variations of a direct-current bias voltage. The regulator herein described as an embodiment of the present invention is such that it responds to a control signal which is a square wave voltage signal with a frequency of about 1 to 10 cycles per second. The solenoid energizing voltage time of the regulator in relation to deenergizing time is varied in accorrance with a condition or conditions such as temperature obtaining in a given zone or zones so that the controlled vacuum regulator output is produced at a corresponding level.

An object of the present invention is to provide an improved device for regulating a vacuum level in accordance with an electrical current signal indicating at least one condition such as temperature.

A feature of the invention is a solenoid-operated vacuum regulator including a casing encompassing three chambers connected in series by bleed ports with the first and third of the chambers being separated by a diaphragm.

This and other features of the invention will become further apparent from the appended description and claims.

The regulator forming one embodiment of the present invention is shown in the drawing and comprises a casing 10 with which is associated a solenoid coil 12 and an armature 14. The casing 10 encompasses three chambers 16, 18 and 20. It also includes a cover member 22 forming one wall of the first chamber 16 and which is clamped to the main body of the casing 10 tightly to engage the periphery of a diaphragm 24 which serves to separate the chamber 16 from the third chamber 20. A coil spring 26 is positioned within the chamber 16 urging the diaphragm 24 toward the chamber 20. A metal plate 28 is interposed between the spring and the diaphragm and serves to retain a second plate 30 on the other side of the diaphragm together with a resilient valve means 32 in position on the diaphragm and in substantial axial alignment with two coaxial passages 34 and 36. The passage 34 is formed in an inlet element 38 which is in the form of a nipple passing through the wall of the cover 22 and having an annular end surface 39 facing the valve means 32. The passage 36 is formed in the main body of the casing 10 to terminate at an inner casing surface 40 and communicates with a bore 41 and a passage 42 in an outlet nipple 44.

The diaphragm 24 is apertured near its periphery at 46 and in registry with a passage 48 which communicates by means of a restricted orifice or first bleed port 49 with the chamber 18 through a boss 50 formed on the casing 10. The first bleed port 49 terminates at a flat surface 51 on the casing. A base plate 52 is fixed to the casing 10 together with the outturned margin 54 of a solenoid cup-like container 56. A gasket 58 is located between the plate 52 and the casing 10 to make a fluid tight joint. A second bleed port 59 connects the second chamber 18 to the third chamber 20.

A cylinder 60 of dielectric material is located within the casing 56 to hold the coil 12 and is centrally ported slidably to receive an armature 14 which is in the shape of a spool. This armature is urged toward the casing 10 by means of a coil spring 62 which is held in a recess 64 formed in a cylindrical member 66 fixedly held within the cylinder 60 by a threaded neck 68 forming a part of the container 56. The member 66 is also provided with a second bore 70 for receiving filtering material (not shown) and this second bore communicates with the spring bore 64 by means of a restricted air inlet port 72. Two terminals 74 and 76 lead through an end flange of the dielectric cylinder 60 for conducting current to and from the coil 12 as will be understood. The inner wall of the cylinder 60 contacting the armature 14 bears a longitudinal groove 78 which extends from the base plate 52 to an area intermediate the lengths of the cylinder 60 and the member 66.

The end of the armature 14 nearest the casing 10 bears a boss or hub 80 which is received, with a clearance around it, in an aperture 82 formed in the plate 52. The end of the boss bears an annular groove 84 for the retention of a cylindrical and resilient valve member 86. The latter is of such length in an axial direction and in alignment with the boss 80 and the orifice 49 that it falls short of the distance between the surface 51 on the boss 50 and a surface 88 on the plate 52.

In the operation of the regulator it may be assumed that an automotive engine manifold vacuum line is connected to the inlet nipple 38 and the outlet nipple 44 is connected to a vacuum motor the action of which is to be controlled in accordance with the vacuum supplied. An electrical control signal suitably amplified is imparted in the form of a square wave voltage passed through the terminals 74 and 76 to energize the coil 12 in pulses.

As the engine manifold pressure in the first chamber 16 decreases below atmospheric pressure and considering the solenoid coil 12 to be deenergized, the diaphragm 24 will move to compress the spring 26. In so doing, it will finally cause a seal between the surface 39 on the nipple 38 and the valve means 32 to prevent the pressure in the chamber 16 from decreasing below a value determined by the effective area of the diaphragm and the loading of the spring 26. This pressure in the chamber 16, therefore, is sealed when the solenoid is deenergized and because of the action of the spring 26, the solenoid plunger 14 is acted upon by the spring 62, and the seal is made at the surface 51. At this time, there is a path for entering air to the second chamber 18 and it is by way of the filter chamber 70, the port 72, the groove 78 and the aperture 82.

However, when the solenoid is energized the armature 14 will move against the compression of the spring 62 and the pressure at the first bleed port 49 is applied to the second chamber 18 while the incoming atmospheric air flow through the solenoid is interrupted by the action of the resilient valve means 86 in seating against the surface 88.

During normal operation of the solenoid, its pulsing produces a pressure in the chamber 18 below atmospheric air pressure and at an extent depending on the percentage of solenoid energized time to deenergized time for each cycle of the electrical signal. This pressure in the second chamber 18 is also applied to the third chamber 20 but the second bleed port 59 between the second and third chambers prevents undue fluctuation of the pressure in the third chamber 20. It will be noted that the diaphragm 24 is affected by the pressures in chambers 16 and 20 and therefore the pressure regulator section has a differential pressure function and the regulated or controlled pressure in the first chamber 16 will always be at a lower pressure level than that in the chamber 20. During acceleration of the automobile in which the vacuum source is the intake manifold of the engine, the pressure level in the first chamber 16 may unduly increase. In this event, the spring 26 will supplement the action of the pressure in chamber 16 and the diaphragm 24 to effect a seal between the valve means 32 and the surface 40. The pressure level in the port 36 will therefore remain fixed until the engine manifold pressure decreases to the control level of the regulator.

I claim:

1. A vacuum regulator comprising a casing with a solenoid armature and coil attached thereto, said casing having a vacuum supply inlet and a modulated vacuum outlet and defining three chambers, said inlet and outlet communicating with the first and third of said chambers respectively, a first bleed port connecting the first chamber with the second chamber, a second bleed port connecting the second chamber with the third chamber, a spring-loaded diaphragm separating the first chamber from the third chamber and carrying first valve means controlling the said inlet and outlet, an air inlet to said second chamber, second valve means carried by said armature and arranged to control said first bleed port and said air inlet in accordance with the ratio of the energized time to the deenergized time of said coil.

2. A vacuum regulator comprising a casing with a solenoid armature and coil associated therewith, said casing including three chambers, an inlet and an outlet communicating with the first and third of said chambers respectively, a first bleed port connecting the first chamber with the second chamber, a second bleed port connecting the second chamber with the third chamber, a spring-loaded diaphragm cooperating with said casing in defining said first and third chambers and carrying first valve means interposed between said inlet and outlet to control the same, an air inlet communicating with said second chamber, and second valve means connected to said armature to move therewith and being interposed between said first bleed port and said air inlet to control said first port and inlet.

3. A vacuum regulator comprising a casing with a solenoid armature and coil operatively positioned with respect to said casing, said casing encompassing three chambers, a spring-loaded diaphragm separating a first of said chambers from the third, vacuum supply inlet and modulated vacuum outlet ports communicating with the first and third of said chambers respectively and being disposed at opposite sides of said diaphragm, valve means carried by said diaphragm and positioned to close and open said inlet and outlet ports upon movement of said diaphragm, a first bleed port connecting said first chamber with the second chamber, an air inlet to said second chamber, valve means movable by said armature to open and close said first bleed port and air inlet, and a second bleed port connecting said second chamber to the said third chamber.

4. A vacuum regulator as set forth in claim 3, the said air inlet and first bleed port being substantially coaxial, and said vacuum supply inlet and modulated vacuum outlet ports terminating coaxially with said diaphragm carried valve means.

5. A vacuum regulator as set forth in claim 3 in which said second bleed port constitutes a restricted open passage preventing undue fluctuations in pressure within the said third chamber.

No references cited.